Jan. 4, 1966  R. L. LANDIS  3,226,780
SEALING MEANS
Filed July 6, 1964  4 Sheets-Sheet 1
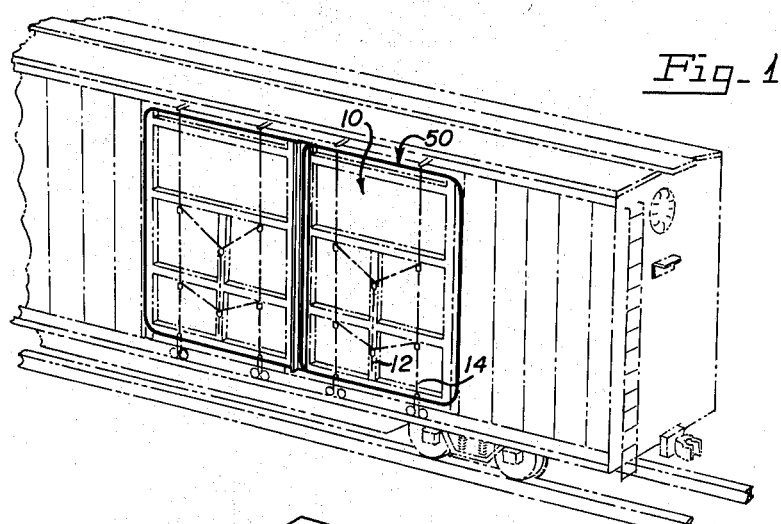
Fig_1
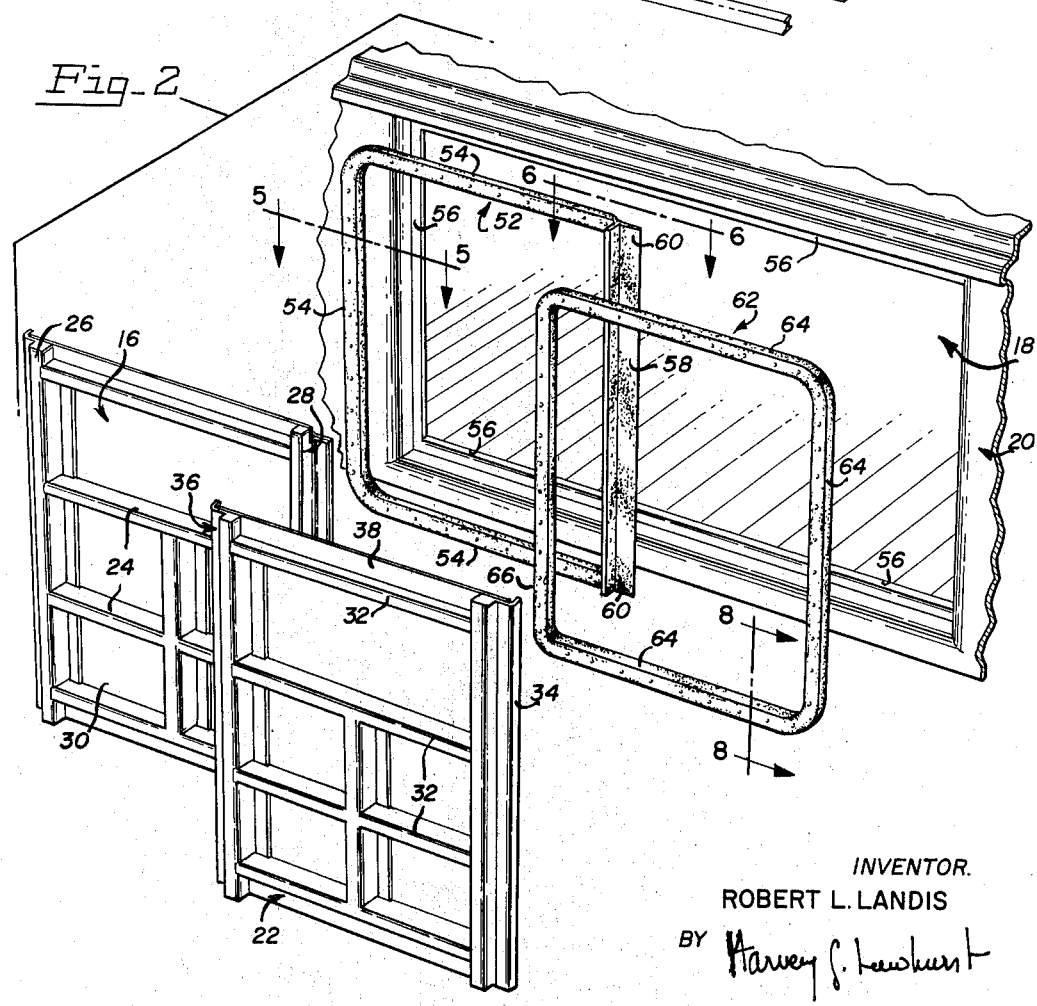
Fig_2
INVENTOR.
ROBERT L. LANDIS
BY Harvey C. Lewhurst
ATTORNEY

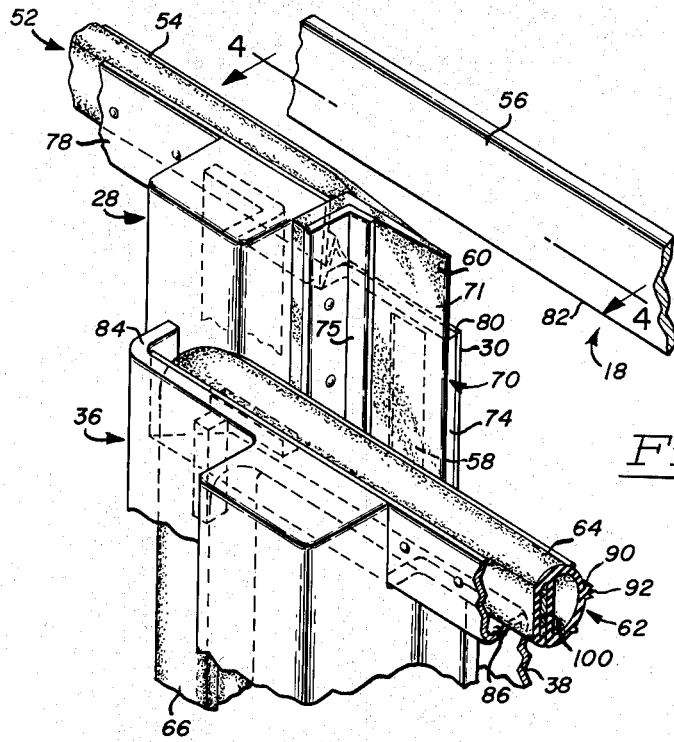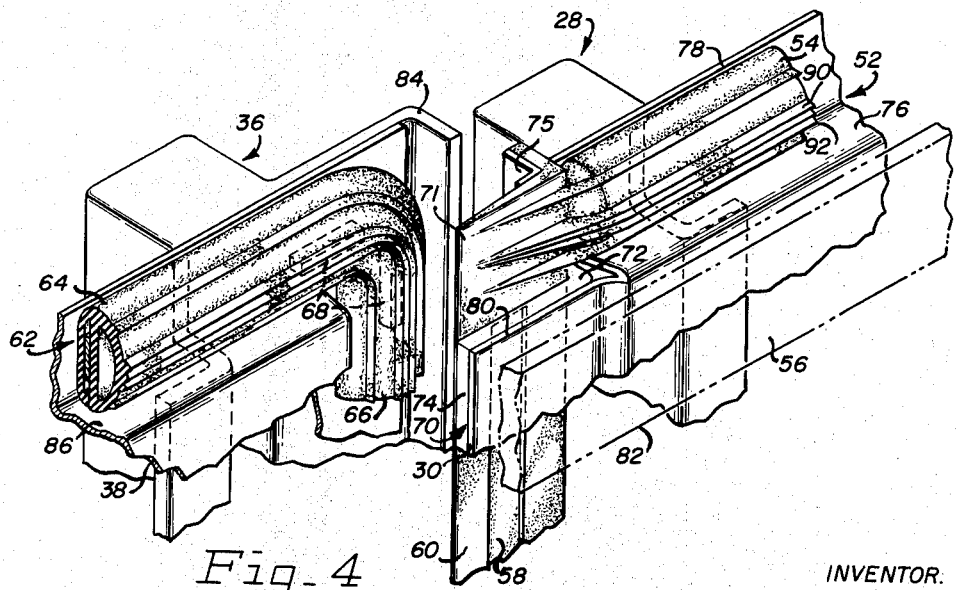

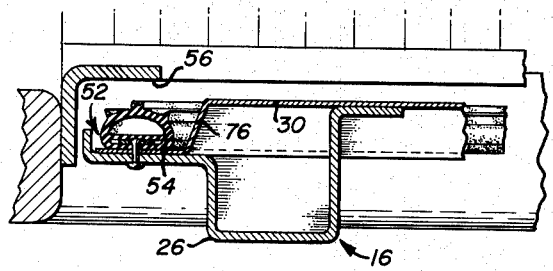
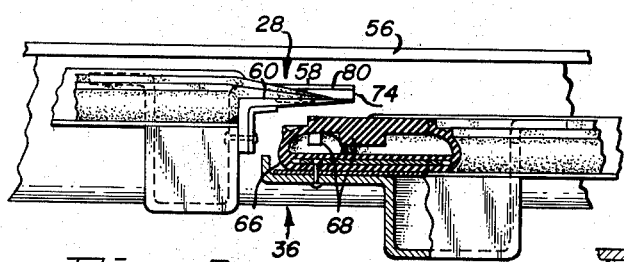
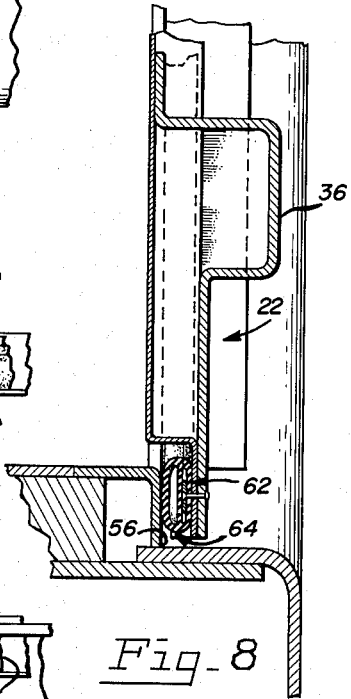
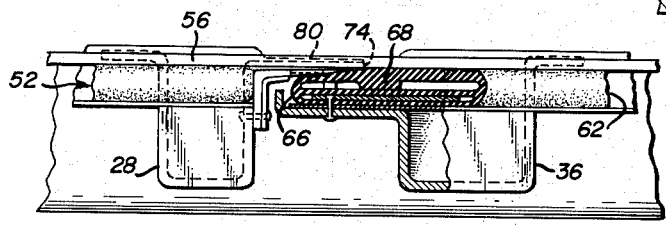
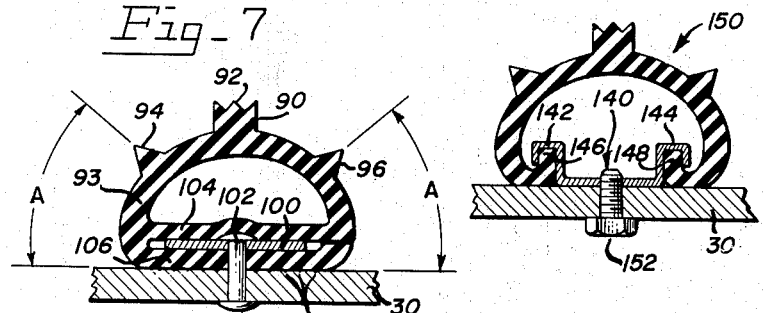
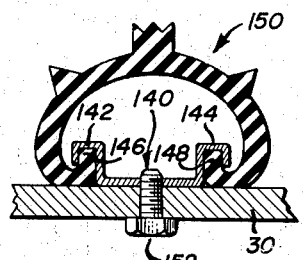
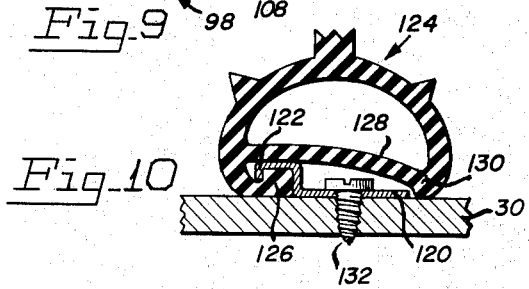
INVENTOR.
ROBERT L. LANDIS
ATTORNEY

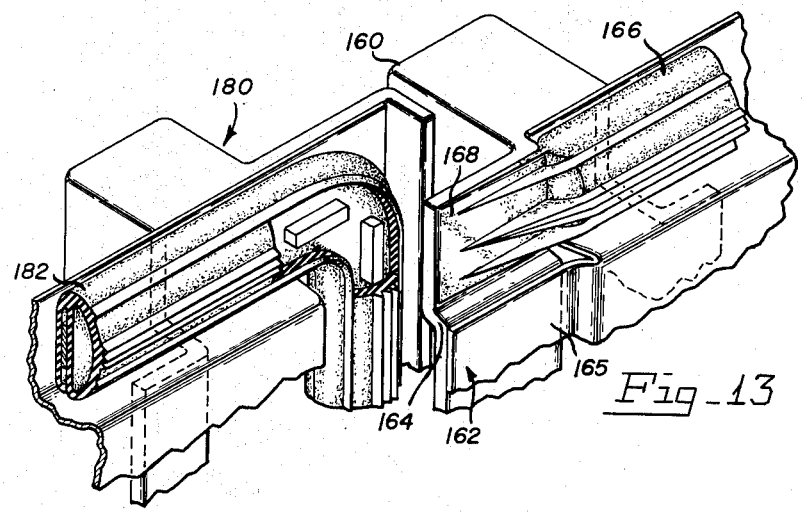
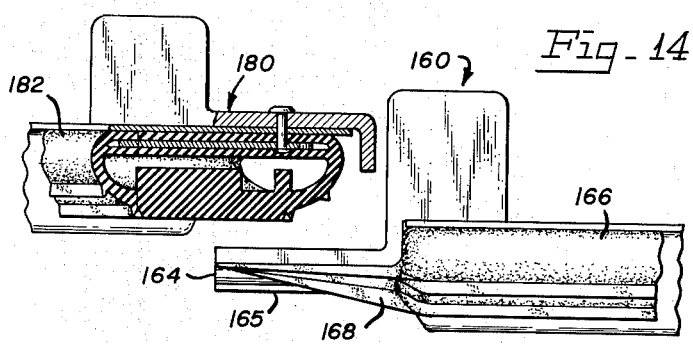
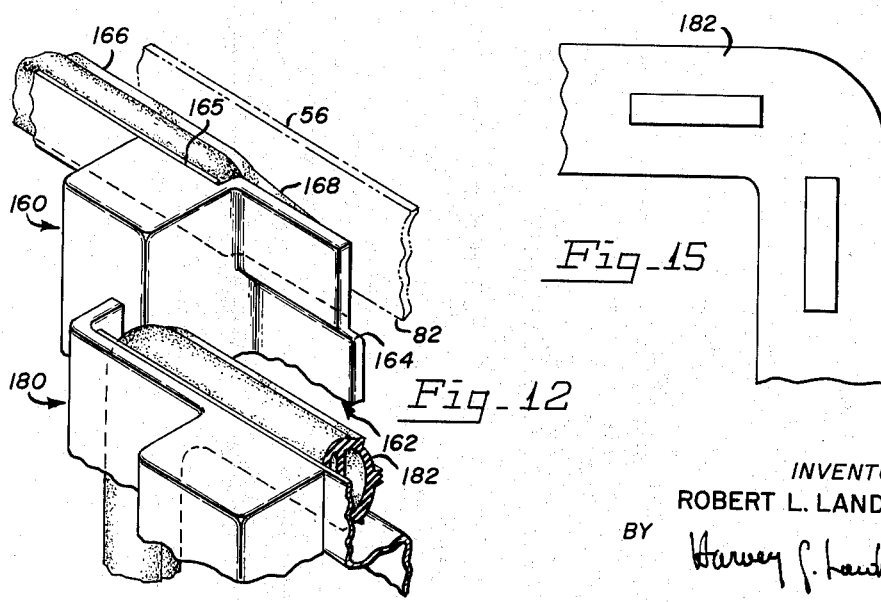

United States Patent Office 3,226,780
Patented Jan. 4, 1966

3,226,780
SEALING MEANS
Robert L. Landis, 25538 Adobe Lane,
Los Altos Hills, Calif.
Filed July 6, 1964, Ser. No. 380,450
8 Claims. (Cl. 20—69)

This invention relates to a sealing means and more particularly to sealing means for freight car doors or similar arrangements.

In many devices it is important that an enclosure be provided with a large entrance or opening which may also be sealed in an airtight manner. For example, in freight cars, refrigerated or otherwise, it is important that easy access to the interior be coupled with air tight sealing of the access or opening. When freight cars carry food, machine parts or other articles subject to deterioration, openings in or around the doors of the car will result in contamination of the interior and harm to the contents. The vibrations of the freight car set up by the track structure in combination with accelerations and decelerations make effective sealing of the openings a constant problem. This problem is particularly pronounced in long trips over rugged and irregular terrain.

The sealing problem is further accentuated when heavy doors of the plug type construction are used. In freight cars each door may be eight to ten feet square and weigh approximately fifteen to eighteen hundred pounds. In the plug type construction as contrasted with sliding door construction, the doors first move transverse to the length of the car which movement unplugs the door opening and they then slide longitudinally along the side of the freight car to permit access to the interior the car. The transverse movement of the plug type doors into the opening requires the application of large forces to effectively form a seal. These doors are generally provided with a mechanical mechanism that provides a considerable mechanical advantage that aids in supplying adequate sealing forces. In operation the doors are first manually pushed transversely into the door opening and then the mechanical mechanism is applied to provide the final closing force.

Where plug type doors are used to seal an entry or an opening in a freight car there has been considerably further difficulty in obtaining a seal around the top and bottom of the doors where they abut one another and also about the framing of the freight car opening. The prior art devices have generally attempted to solve this problem with the use of a three sided gasket on at least one of the doors.

The instant invention solves the above problems by providing a seal which is effective in the most adverse environment and particularly well suited for plug type door construction. The seal has a construction which requires relatively little force during its initial contact with the framing surface of the door. The greater part of the sealing force is required during the very last portion of the sealing movement when the mechanical mechanism is active. The invention also provides a seal at the junction of the doors and frame by including a novel four sided gasket which cooperates with a slightly modified plug door construction and a four sided gasket on the adjacent door.

Consistent with the above, the general object of the invention is to provide an improved seal.

Another object of the invention is to provide a seal which is effective in extreme environments.

Another object of the invention is to provide a seal for a plug type of freight door construction that is effective around the entire perimeter of the door.

Another object of the invention is the provision of a seal that does not require a great deal of force during the manual portion of door closing.

Another object of the invention is to provide an improved freight car door construction and an improved three sided seal member which provides an improved seal along the door juncture.

Another object of the invention is to provide an improved freight car door construction and an improved four-sided seal member which provides an improved seal along the door juncture.

These objects and other objects and advantages will be fully understood when the detailed description that follows is taken in conjunction with the drawings, wherein:

FIG. 1 is a perspective view of a freight car having a plug type door;

FIG. 2 is an exploded perspective view of a portion of the freight car and a part of the doors and sealing means;

FIG. 3 is a perspective view of a part of the door, frame and sealing means where the doors are adjacent to one another and to the frame;

FIG. 4 is a rear perspective view of the structure of FIG. 3;

FIG. 5 is a sectional plan view taken along the lines 5—5 of FIG. 2 with the sealing means or gasket on one of the doors in the proximity of the frame;

FIG. 6 is a plan view similar to FIG. 6 but taken along lines 6—6 of FIG. 2;

FIG. 7 is a plan view like FIG. 6 with the sealing means in contact with the frame;

FIG. 8 is a sectional side view taken along the lines 8—8 of FIG. 2 with the sealing means in contact with the frame;

FIGS. 9, 10, and 11 are cross-sectional views of alternate sealing means and retainers that may be utilized as part of the invention.

FIG. 12 is a perspective view of an alternate construction of a portion of the sealing means and one of the doors;

FIG. 13 is a rear perspective view of the alternate construction shown in FIG. 12;

FIG. 14 is a top view of the construction shown in FIG. 13; and

FIG. 15 is a front view of part of the construction shown in FIG. 13.

In general the sealing means of this invention includes a pair of four sided gaskets or sealing means. One gasket is placed on each of two surfaces such as the main and auxiliary doors of a plug type door construction for freight cars. A side of one of the gaskets is irregularly or flap shaped. This side is mounted adjacent or on the leading edge of the auxiliary door. The flap shaped side, the leading edge and an adjacent edge of a second surface or main plug door cooperate to provide a substantially perfect seal. The gasket has a configuration that provides a reliable seal while taking full advantage of the mechanical mechanism associated with the plug type door.

While the sealing means of this invention will be described in the environment of plug type doors for a freight car, it should be understood that this structural environment is only exemplary. Certain aspects of the invention may be employed on other surfaces or devices.

Referring to FIG. 1 a freight car and plug door means 10 are shown in outline, while the sealing means 50 is shown in solid lines. The plug door means 10 includes a saddle 12 and a securing or holding mechanical mechanism or means 14 for securing the door in a fixed position. The securing means 14 generally provides a substantial mechanical advantage for the last part of the door insertion or transverse travel. These mechanisms are well known in the art and any one of them may be used with the invention.

The plug door means 10 consists of two parts (FIG. 2). One part is an auxiliary door or first surface means 16 for closing a part of the opening 18 formed by the door frame 20. The other part of the plug door means is a main door or second surface 22 for closing the remaining part of the opening 18.

The auxiliary door 16 is constructed from a plurality of horizontal structural members 24 which may be made from any suitable material such as aluminium or steel sheet metal or tubing. The horizontal structural members 24 are fastened to a pair of vertical structural members 26 and 28 by appropriate fabrication techniques such as welding. The vertical members 26 and 28 are referred to specifically as lagging edge member 26 and the auxiliary leading edge means or member 28. The importance of the specific deatils of the leading edge means 28 will be considered later in the specification.

The support structure formed by the horizontal members 24 and the vertical members 26 and 28 are secured to a backing or sheet member 30. The backing member 30 is made from a suitable metal and secured to the support structure by welding, rivets or other fastening means. The main door 22 is constructed in a manner similar to the auxiliary door 16 and comprises horizontal members 32, main lagging edge member 34, main leading edge member 36, and sheet member 38. The most significant difference between the main door 22 and the auxiliary door 16 resides in the leading edge construction and its cooperation with the sealing means 50.

The sealing means 50 comprises a first gasket or seal means 52 and a second gasket or sealing means 62. The first gasket 52, which is attached to the auxiliary door 16, is a four sided deformable member that is preferably made from one of the common rubber materials. Three of the sides 54 of the gasket 52, when in fixed position, sealingly engage the frame surfaces 56. A fourth side 58 is an irregular or flap shaped portion. This side bridges the opening 18 and has only its flap portion ends 60 in contact with the frame surfaces 56.

The gasket 62, which is attached to the main door 22, is also a four sided deformable gasket member that is made from one of the common rubber materials. The three sides 64 of gasket 62 are virtually identical with the side 66 with the exception that side 66 when in fixed position engages the flap 58 while the sides 64 engage the frame surfaces 56. The gasket 62 has a plurality of internal reinforcements or abutment means 68 (FIG. 4) for providing a firm seal at the juncture of the two doors 16 and 22 and the frame surface 56.

The structure of the leading edge means 28 and 36 can best be understood by reference to FIGS. 3 and 4. The auxiliary leading edge means 28 has an angular portion or backing member 70 that is adapted to support the flap side 58 along its length with the exception of a short inwardly facing portion 71 at the ends 60 which abut and seal the frame surface 56. The backing member or angular portion 70 takes the form of a right angle member with leg 72 (FIG. 4) approximately perpendicular to the frame surface 56 and leg 74 located approximately parallel to the frame surface 56. The flap side 58 abuts the leg 74 and is held in place by the member 75.

The sheet member 30 is fabricated to conform to the shape of the leading edge member 28. In addition the sheet member 30 forms a ledge 76 for facilitating the positioning and assembly of the gaskets. The ledge 76 is continuous with side 78 to which the gasket sides 54 are attached.

An important feature of the construction of the leading edge means 28 is that legs 72 and 74 are cut so that their top surfaces are below the lower surfaces 82 of the frame (FIG. 3). The ledge 76 is also formed to fit under the surface 82. This construction of the ledge 76 and legs 72 and 74 enable flap ends 60 and the upper and lower sides 54 to be positioned in sealing engagement with the upper and lower frame surfaces 56. The sealing by the feathered edge 60 along with the sealing action of the gasket member 62 against the feathered portion enables the sealing of the juncture of the main and auxiliary doors with the frame surface 56.

The main door leading edge 36, with a construction as shown in FIGS. 3 and 4, is placed in position after the auxiliary door leading edge 28 and it overlaps the flap side 58. Briefly, the main leading edge comprises the vertical member 36 with an edge 84 and the sheet member 38 formed with a ledge 86 and secured to vertical member 36. The edge 84 is spaced a short distance from the member 75 to provide a clearance between the main and auxiliary leading edges. The ledge 86 like that of ledge 76 is proportioned to fit under the lower frame surface 82. It should be noted that on both doors there are ledges, like 76 and 86 around the perimeter of the door which fit within the frame. These ledges enable the gaskets 52 and 62 to engage the frame surfaces 56.

The gaskets 52 and 62 are identical in construction with the exception of the portions of the leading edges 28 and 36 which have been discussed above. The cross-sectional configuration of the gasket 52 and 62 is an important factor in determining their flexibility and deformability. The cross-section of the gaskets used in the embodiment of FIGS. 3 and 4 is clearly shown in FIG. 9. This gasket has a breaking rib 90 with a sawtooth top surface 92 that forms a plurality of sealing surfaces. The breaking rib 90 is located approximately midway along the semicircular wall or crown 93 forming the body of the gasket. When the gaskets are positioned in contact with the surfaces 56, the breaking rib 90 is pushed in toward the sheet members 30 and 38 flattening the semicircular wall 93. The initial flattening of the wall 93 requires a minimum of force while the terminal compression requires a great deal of the force.

The sawtooth surface 92 contributes to the sealing action but the primary seal is effected by two large triangular sealing lips 94 and 96. The sealing lips 94 and 96 are located about 80 to 120 degrees apart with angle A in the range of about 30 to 50 degrees. When the sealing lips 94 and 96 are in contact with the surface or door to be sealed they are flexed to sealingly engage the surfaces 56. In addition any air pressure exerted from the outside or inside of the sealed surface will tend to press the sealing lips 94 and 96 into firmer contact with the sealed surface. The height of the sealing lips 94 and 96 and their angles are important in this function. This structure is to be contrasted with such prior art seals shown in U.S. Patent 3,023,466 issued to R. L. Landis on March 6, 1962 and U.S. Patent 2,379,193 issued to A. L. Shields on June 26, 1945. These prior art structures would not flex like sealing lips 94 or respond materially to any environmental pressures.

From the above it can be seen that a seal is first effected by the breaking rib 90 contacting the surfaces 56 which flattens the semicircular wall 93. This first sealing requires little force. With the flattening of the wall 93 the sealing lips 94 and 96 contact the surfaces 56 and are flexed. The continued flexing of the lips 94 and 96 along with the continued flattening of the wall 93 requires much greater forces. The greater forces are typically required during the terminal or final one-quarter inch of seal compression or movement while the total compression of the gaskets may run as much as one inch.

The gaskets 52 and 62 are secured to the surfaces of sheet members 30 and 38 by a retainer 98 that comprises a flat holding means 100 and a plurality of rivets 102. The holding or securing strip means 100 is positioned between a flat base member 104 and a flap 106. Both base member 104 and flap 106 are continuous with wall 93 and extend the full width of the gasket. The flap 106 is provided with slip resistant beads or ribs 108.

The gaskets 52 and 62 are assembled by bending the semicircular wall portion or crown 93 back so that the flap 106 is exposed (FIG. 9). The securing strip 100 is positioned over the flap 106 and the rivets 102 are applied to urge the flap 106 and beads 108 against the sheet member 30 or 38.

The cooperation and operation of the sealing means described above can best be understood by reference to FIGS. 5–8. The auxiliary door 16 (FIG. 5) is first moved longitudinally into position. The main door 22 is then moved longitudinally so that its leading edge 36 overlaps the auxiliary leading edge 28 (FIG. 6). The doors are then moved transversely so that the main door 22 and the auxiliary door 16 and their gaskets 52 and 62 move from the position such as shown in FIG. 6 into abutment with the frame surface 56 (FIGS. 7 and 8). FIG. 8 shows the main door 22 with its gaskets 62 in abutment with the surface 56. The gasket 52 seals against the surface 56 in essentially the same manner. At the leading edges 28 and 36 the side 66 sealingly engages the flap side 58 along its length and urges its ends 60 into sealing engagement with the surface 56. The top side of gasket 52, the feathered edge 60 and the top side of 62 form a continuous seal along the frame surface at the juncture of the doors. The internal ribs 68 aid in creating a firm seal at the juncture. A similar seal is formed along the bottom surface.

As set forth in the introductory portions of the specification it should now be apparent that a new and improved seal has been invented. The sealing means has a cross section that effectively seals and is harmonious with characteristics of the mechanical closing mechanism. The seal arrangement of two four sided gasket with two of the sides in overlapping sealing relationship enables a perfect seal at the door juncture. This overlapping combined with the modified leading edges further enables the sealing at the frame surfaces where the doors overlap.

There are numerous further modifications that are readily apparent to one of ordinary skill in the art. For example, many types of retainers could be used in the invention. Two such retainers are shown in FIGS. 10 and 11. In the retainer of FIG. 10 a base plate 120 has a shoe or finger 122 that snaps over or grips a bead or ridge 126 on the underside of the gasket 124. The circular wall or crown construction of the gasket 124 is identical with that of gasket 52 or 62 shown in FIG. 9. The gasket 124 does have a modified or curved base 128 that terminates with a toe 130. For installation crown 124 is bent about the bead 126, the shoe is 122 snapped in position, and the screws 132 are inserted to fasten the base plate 120 to the sheet member 30.

The retainer 140 shown in FIG. 11 differs from the one shown in FIG. 10 in that it has two shoes or gripping fingers 142 and 144. These shoes 142 and 144 cooperate with two internal beads or ridge members 146 and 148 that are continuous with the circular wall of the gasket 150. The gasket 150 is secured to the sheet member 30 by first loosely securing the retainer to the sheet member 30 with fastening means 152. The shoes 142 and 144 are then snapped over the ridge members 146 and 148, and the fastening means 152 is further tightened to firmly secure the gasket 150 to the sheet member 30.

An alternate embodiment of the main door and auxiliary door leading edge construction is shown in FIGS. 12–15. In this alternate construction the vertical or leading edge member 160 has an angular leg 162 and terminal end portions that lie parallel with the frame surface 56 when the doors are moved into adjacent aligned positions. The leg 162 is not recessed like member 28 but it is offset at 164 which is a point lower than the surface 82. The sheet member 165 terminates at the offset 164. The offset 164 enables a simplified three sided gasket 166 with its added flap portion one of which is shown at 168 to sealingly engage the frame surface 56. The added flap portion 168 takes the form of a tapered flap with a plurality of tapered sealing lips. Two sides of the three sided gasket 166 are extended between and beyond the juncture of the doors and adjacent the frame surface 56 to form the flap portions such as 168. The added flaps enable the juncture between the doors and frame to be sealed. It should be noted that the leg 162 is positioned behind the flap portion 168 to support it, rather than in front of the flap side 58 as shown in FIG. 3.

The main door leading edge 180 is identical in construction with the one 36 shown in FIG. 3. The gasket 182 on the main door leading edge 180 sealingly engages the leg 162 to complete the sealing of the leading edges. This construction is simpler than the one shown in FIG. 3 and may be used on many freight car doors without modifying the door construction. It is effective in most situations but it is not as satisfactory for extreme heavy duty requirements as the arrangement shown in FIG. 3.

In summary, the invented sealing means provides such novel features as two four sided gaskets acting cooperatively to seal an opening, a four sided and modified three sided gasket acting cooperatively to seal an opening, effective sealing of the juncture of two surfaces and three surfaces and unique gasket construction adapted to minimize initial or manual sealing forces. These are but a few of the many novel features described in the above description. While I have illustrated and described a preferred embodiment of the present invention and modified forms thereof, it will be understood, however, that various changes and modifications may be made in the details thereof without departing from the scope of the invention as set forth in the appended claims.

What is claimed is:

1. In sealing construction of the class described, in combination:

framing means defining an opening;

first and second doors having sealing means on at least a portion of their peripheries, said doors being movable laterally into adjacent aligned positions and in abutting sealing contact with at least the greater portion of the periphery of said framing means;

a backing member carried by the leading edge of said first door and projecting beyond one edge thereof and behind the leading edge of said second door when said doors are brought into adjacent aligned positions, said backing member also including at least a portion which lies within the plane of said framing means; and a feathered edge portion carried by the sealing means on said first door which extends above said backing member and lies parallel with said framing means when the doors are brought into aligned sealing engagement.

2. In sealing construction of the class described, in combination:

framing means defining an opening;

first and second doors having sealing means on at least a portion of their peripheries, said doors being movable laterally into adjacent aligned positions and in abutting sealing contact with at least the greater portion of the periphery of said framing means;

a backing member carried by the leading edge of said first door and projecting beyond one edge thereof and behind the leading edge of said second door when said doors are brought into adjacent aligned positions, said backing member also including at least a portion which lies within the plane of said framing means; and a feathered edge portion carried by the sealing means on said first door which extends above the said portion of said backing strip lying in the plane of said framing means and which lies parallel with said framing means when the doors are brought into aligned sealing engagement.

3. In the sealing construction as claimed in claim 2 wherein the said backing member includes an upper terminal portion which terminates within said opening to thereby expose said feathered edge portion to direct sealing contact with the sealing means on said second door.

4. In the sealing construction as claimed in claim 2 wherein the said backing member includes at least an upper terminal portion which is outwardly offset with respect to the said portion within the plane of said framing means to overlie outside of and parallel to said framing means, said feathered edge portion lying between said framing means and said upper terminal portion.

5. In sealing construction of the class described, in combination:

framing means defining an opening;

first and second doors having sealing means on at least a portion of their peripheries, said doors being movable laterally into adjacent aligned positions and in abutting sealing contact with at least the greater portion of the periphery of said framing means;

a backing member carried by the leading edge of said first door adapted to project beyond one edge thereof and behind the leading edge of the second door when said doors are brought into adjacent alignned positions, the sealing means on the abutting edge of the second door overlying and in sealing contact with said backing member, said backing member including coplanar terminal end portions adapted to overlie outside of and parallel with opposed portions of said framing means; and feathered edge portions carried by the sealing means on said first door adjacent the leading edge thereof adapted to lie between said framing means and said terminal end portions when the respective doors are moved into adjacent aligned position and sealing contact.

6. In sealing construction of the class described, in combination:

framing means defining an opening;

first and second doors having sealing means on at least a portion of their peripheries, said doors being movable laterally into adjacent aligned positions and in abutting sealing contact with at least the greater portion of the periphery of said framing means;

a backing member having terminal edge portions carried by the leading edge of said first door and projecting beyond one edge thereof and behind the leading edge of said second door and extending across said opening between opposite interior edges of said framing means when said doors are brought into adjacent aligned positions, the sealing means on the abutting edge of said second door overlying and in sealing contact with said backing member; and feathered edge portions carried by the sealing means on said first door and extending above and below the terminal edge portions of said backing member and lying parallel with said framing means and between said framing means and the sealing means on said second door when the respective doors are moved into adjacent aligned position and sealing contact.

7. In the sealing construction as claimed in claim 5, wherein the sealing means carried by said first door comprises a substantially continuous body formed of resilient compressible material, at least two sides of said body having a substantially flat inner base portion and including an integrated cushion wall semicircular in cross-section, said cushion wall including longitudinally disposed breaking ribs, said feathered edge portions projecting in the plane of said body beyond the extent of said cushioned walls with the longitudinal breaking ribs extending from two sides of said body and merging into said feathered edge portions.

8. In the sealing construction as claimed in claim 4, wherein the sealing means carried by said first door comprises a substantially rectangular continuous body formed of resilient compressible material, at least three sides of said body having a substantially flat inner base portion and including an integrated cushion wall semicircular in cross-section, said cushion wall including longitudinally extending breaking ribs, said feathered edge portion extending in the plane of said body connecting said cushioned walls with the said longitudinal breaking ribs extending from two sides of said body and merging into said feathered edge portion.

References Cited by the Examiner

UNITED STATES PATENTS

| | | | |
|---|---|---|---|
| 2,101,465 | 12/1937 | Beers | 312—189 |
| 2,332,195 | 10/1943 | Bergstrom | 20—35 |
| 2,379,193 | 6/1945 | Shields | 20—35 |
| 2,624,596 | 1/1953 | Clingman. | |
| 2,720,011 | 10/1955 | Krupp | 20—69 |
| 2,811,406 | 10/1957 | Moore et al. | 20—35 |
| 3,117,352 | 1/1964 | Reahard et al. | 20—69 |
| 3,161,925 | 12/1964 | Bertolini | 20—69 |

FOREIGN PATENTS 752,640   7/1933   France.

CHARLES E. O'CONNELL, *Primary Examiner.*

HARRISON R. MOSELEY, REINALDO P. MACHADO, *Examiners.*

A. I. BREIER, *Assistant Examiner.*